| United States Patent [19] | [11] Patent Number: 4,808,361 |
| Castro et al. | [45] Date of Patent: Feb. 28, 1989 |

[54] METHOD FOR FORMING AN IN-MOLD COATED FIBER REINFORCED PART

[75] Inventors: Jose' M. Castro; Elliott J. Straus; Henry Shanoski, all of Akron, Ohio

[73] Assignee: Gencorp Inc., Akron, Ohio

[21] Appl. No.: 26,414

[22] Filed: Mar. 16, 1987

[51] Int. Cl.$^4$ .............................................. B29C 43/20
[52] U.S. Cl. .................... 264/255; 264/40.5; 264/246; 264/DIG. 59; 428/423.7; 428/424.4
[58] Field of Search ............... 264/255, 257, 294, 320, 264/325, 266, 2.2, 2.7, 40.5, 246, 247, 229, 272.13, 342, DIG. 59; 425/111, 149, 543; 428/285, 28 C, 287, 430, 423.7, 424.4

[56] References Cited

U.S. PATENT DOCUMENTS

| 3,681,483 | 8/1972 | Moore | 264/294 |
| 4,076,788 | 2/1978 | Ditto | 264/325 |
| 4,353,857 | 10/1982 | Rey et al. | 264/258 |
| 4,367,192 | 1/1983 | Arnason | 264/255 |
| 4,473,215 | 9/1984 | Rathfon, II et al. | 264/40.5 |
| 4,489,031 | 12/1984 | Oglihara | 264/294 |

FOREIGN PATENT DOCUMENTS 1457935 12/1976 United Kingdom ............... 264/255

*Primary Examiner*—James Lowe
*Assistant Examiner*—Jeremiah F. Durkin, II

[57] ABSTRACT

A method of making a fiber reinforced part by compression molding under heat and pressure a glass fiber reinforced thermosetting resin composition at an initial high pressure for a short period of time and then substantially reducing the pressure for a longer period of time to form an almost cured FRP part at which time there is applied to the exterior or outer surface of the FRP part an in-mold coating composition and heat and pressure are continued to cure the in-mold coating composition and to complete the cure of the FRP part. During the molding process the temperature gradient across, or the temperature non-uniformities of, the molding or working surfaces of the mold halves is less than about 5° C.

2 Claims, No Drawings

METHOD FOR FORMING AN IN-MOLD COATED FIBER REINFORCED PART

This invention relates to a method or process for molding a glass fiber reinforced thermosetting resin composition to form an FRP (fiberglass reinforced plastic) part and for in-mold coating (IMC) said part.

An object of this invention is to provide a method for making an improved in-mold coated FRP part.

This and other objects and advantages of the present invention will become more apparent to those skilled in the art from the following detailed description and example.

STATEMENT OF THE INVENTION

Improvements in porosity, sink marks and surface waviness of an FRP part can be achieved by initially compression molding a glass fiber reinforced thermosetting resin composition under heat at high pressure for a short period of time, substantially reducing the pressure on the composition while continuing to apply heat to cure at least about 90% of the composition to form an FRP part, applying a thermosetting in-mold coating on the outer surface of the FRP part, and continuing to apply heat and pressure to cure the in-mold coating and complete curing of the FRP part, while maintaining the temperature non-uniformities across the molding surfaces of the mold at less than about 5° C.

DISCUSSION OF DETAILS AND PREFERRED EMBODIMENTS

During the initial high pressure molding step for the glass fiber reinforced thermosetting resin the pressure is from around 820 to 1200 psi for from about 5 to 12 seconds while during the second step the pressure is reduced to 80 to 330 psi for from about 30 to 100 seconds. During both steps the temperature is from about 147° to 151° C. During the in-mold coating step the pressure is from about 80 to 400 PSI for from about 0.5 to 180 seconds at a temperature of from about 143° to 154° C. During the entire molding process the temperature non uniformities across the molding faces or surfaces of the mold halves (male and female) is less than about 5° C.

Glass fiber reinforced thermoset plastics (FRPs) are made from a cured resin containing glass fibers. The resin can be an unsaturated polyester resin or a vinyl ester resin crosslinked with an unsaturated monomer like styrene using a free radical initiator, e.g., a peroxide. Fillers, maturation agents and low-profile or low-shrink additives and so forth can be added to the curable, moldable compound. They can be a sheet molding compound (SMC) or a bulk molding compound (BMC), or other thermosetting material as well as a high strength molding compound (HMC) or a thick molding compound. The compound can have from about 10 to 75% by weight of glass fibers. Preferably, the SMC compound contains from about 25 to 30% by weight of glass fibers while the HMC compound may contain from about 55 to 60% by weight of glass fibers. The glass fiber reinforced thermoset plastic (FRP) can be rigid or semirigid (may contain a flexibilizing moiety such as an adipate group in the polyester). It, also, may contain other flexibilizing polymers, the elastomers and plastomers, such as the styrene-butadiene block copolymers.

In-mold coatings (IMC) which are thermosetting are now well known. They can be prepared from isocyanate or polyurethane based materials containing unsaturated compounds and also containing the usual low-shrink additives, fillers and conductive carbon black where the coating is later to be electrostatically painted. A preferred IMC composition is based on a polymerizable epoxy based oligomer having at least two acrylate groups with other unsaturated materials and additives.

Apparatus, composition and methods for making and using SMCs, BMCs, HMCs, IMCs and FRPs are known. In this connection please see "Modern Plastics Encyclopedia," 1975-1976, October, 1975, Vol. 52, No. 10A, McGraw-Hill, Inc., New York, pages 61, 62 and 105 to 107; "Modern Plastics Encyclopedia," 1979-1980, October, 1979, Volume 56, Number 10A, pages 55, 56, 58, 147 and 148 and "Modern Plastics Encyclopedia," 1980-81, October, 1980, Volume 57, Number 10A, pages 59, 60 and 151 to 153, McGraw-Hill, Inc., New York, N.Y. Please see, also, "Proceedings Reinforced Plastics/Composites Institute," 31st Annual Conference, The Society of the Plastics Industry, Inc., February, 1976, Todd, Section 18-B, pages 1-5; "Modern Plastics," June, 1976, pages 54-56; "Proceedings of the Thirty-second Annual Conference Reinforced Plastics/Composites Institute," SPI, Washington, February, 1977, Griffith et al, Section 2-C, pages 1-3; "33rd Annual Technical Conference, 1978 Reinforced Plastics/Composites Institute The Society of the Plastics Industry, Inc.," SPI, Ongena, Section 14-B, pages 1-7 and "Reinforced Plastics/Composites Institute," 38th Annual Conference, The Society of the Plastics Industry, Inc., February, 1983, McClusky et al, Section 1-A, pages 1-6. See, also, U.S. Pat. Nos. 4,076,780; 4,076,788; 4,081,578; 4,082,486; 4,187,274; 4,189,517; 4,222,929; 4,235,833; 4,239,808; 4,245,006; 4,245,976; 4,329,134; 4,331,735; 4,367,192; 4,374,238; 4,414,173; 4,438,062; 4,508,785; 4,515,710 and 4,534,888.

The processes and products of the present invention can be used in the manufacture of automobile parts such as grille and headlamp assemblies, deck hoods, fenders, door panels and roofs as well as in the manufacture of food trays, appliance and electrical components, furniture, machine covers and guards, bathroom components, structural panels and so forth.

EXAMPLE

The SMC (for making the FRP part) used in this Example was a conventional composition of unsaturated polyester, styrene, polyvinyl acetate in styrene, calcium carbonate, zinc stearate, magnesium oxide, peroxide catalyst and glass fibers. The IMC composition comprised a diacrylate terminated epoxy based oligomer, a polyoxyethylene glycol dimethacrylate, polyvinylacetate, styrene, hydroxypropyl methacrylate, inhibitor, zinc stearate, cobalt octoate, conductive carbon black, talc and tertiary butyl perbenzoate.

A 17×22 inch compression mold with a ribbed insert was used in a 240-ton press. The temperature gradient across the working mold surfaces (male and female) was maintained within a range of not over 5° C. The molding data obtained on making the FRP part and in-mold coating the same are shown in Tables 1 and 2, below:

TABLE 1

Experimental Conditions For Parts Run Without IMC

| Run No. | Initial Pressure (psi) | Final Pressure (psi) | Time at initial Pressure Seconds | Porosity | Rib Read Thru* |
|---|---|---|---|---|---|
| 1 | 1145 | 1145 | 90 | B | E |
| 2 | 380 | 380 | 90 | C | E |
| 3 | 190 | 190 | 90 | D | D |
| 4 | 95 | 95 | 90 | E | C |
| 5 | 1145 | 95 | 10 | B— | C— |
| 6 | 380 | 95 | 10 | C— | C— |
| 7 | 1145 | 95 | 5 | B— | C |

FOOTNOTES
total cycle time was 90 seconds
Quality scale A-best, E-worst
*Refers only to the ribs that were not plugged before molding.

TABLE 2

Experimental Conditions For Parts Run With IMC

| | SMC Cycle | | | IMC Cycle | | | Quality | |
|---|---|---|---|---|---|---|---|---|
| Run No. | P initial (psi) | P final (psi) | Time at P initial | P initial (psi) | P final (psi) | Time at P initial | Porosity | Rib Read Thru* |
| 11 | 1145 | 1145 | 90 | 1145 | 1145 | 60 | A | C |
| 12 | 1145 | 1145 | 90 | 1145 | 1145 | 60 | A | C |
| 13 | 1145 | 95 | 5 | 95 | 95 | 60 | A | B |
| 14 | 1145 | 95 | 5 | 95 | 95 | 60 | A | B |
| 15 | 1145 | 95 | 5 | 380 | 95 | 2 | A | B |
| 16 | 1145 | 95 | 5 | 380 | 95 | 2 | A | B |

FOOTNOTES
SMC cycle times were all 90 seconds
IMC cycle time 60 seconds
*The note is the same as in Table 1.

The surface waviness of the in-mold coated FRP parts of Run Nos. 11 to 16 was improved as compared to Runs 1 to 7. A is best.

We claim:

1. In a method of forming an in-mold coated fiber reinforced part in a heated compression mold having two parts forming a cavity for molding, said method comprising placing a curable glass fiber reinforced thermosetting resin composition on one of said heated halves of said mold and applying heat and pressure to form a glass-fiber reinforced part, applying a thermosetting in-mold coating composition to at least one surface of said part and applying heat and pressure to said coated part, and removing said coated fiber reinforced part from the mold, the improvement comprising:
   (1) forming a glass fiber reinforced part by closing the mold with a pressure sufficient to force the glass fiber reinforced thermosetting resin composition to flow between the mold parts to conform to the configuration defined by the closed mold at a pressure of from about 820 to about 1200 psi for from about 5 to about 12 seconds and subsequently reducing the pressure to from about 80 to about 330 psi for from about 30 to about 100 seconds to effect about 90% cure of said composition, all at a temperature of from about 147° to about 151° C.,
   (2) applying a thermosetting in-mold coating composition on the outer surface of the fiber reinforced part and applying pressure and completing the cure of said fiber reinforced part, and
   (3) maintaining the difference in temperature between non-uniformities across the molding surfaces of said mold halves at less than about 5° C. during the molding and curing steps.

2. The method which comprises in a heated compression mold having two halves forming a cavity for molding
   (1) placing a curable glass fiber reinforced thermosetting resin composition on one of said heated halves of said mold,
   (2) closing the mold to force the composition to flow between the mold halves to conform to the configuration defined by the mold halves at a pressure of from about 820 to 1200 psi for from about 5 to 12 seconds,
   (3) reducing the pressure to from about 80 to 330 psi for from about 30 to 100 seconds to effect at least about 90% cure of said composition to form an FRP part,
   (4) the temperature during steps (1) to (3) being from about 147° to 151° C.,
   (5) applying a thermosetting in-mold coating composition on the outer surface of the FRP part at a pressure of from about 80 to 400 psi and at a temperature of from about 143° to 154° C. for from about 0.5 to 180 seconds to cure said in-mold coating composition to the surface of said FRP part while completing the cure of said FRP part,
   (6) maintaining the temperature non-uniformities across the molding surfaces of said mold halves at less than about 5° C. during the entire molding and in-mold coating steps 1 to 3 and 5 and,
   (7) removing the in-mold coated FRP part from the mold.

* * * * *